(12) United States Patent
Schaff

(10) Patent No.: US 6,275,029 B1
(45) Date of Patent: Aug. 14, 2001

(54) SYSTEM AND METHOD FOR MONITORING FLYING HEIGHT USING TEXTURED DISKS

(75) Inventor: Michael D. Schaff, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/021,230

(22) Filed: Feb. 10, 1998

(51) Int. Cl.$^7$ .............. G11B 5/82; G11B 33/10; G11B 17/32; G01R 33/12; B32B 3/02

(52) U.S. Cl. .......... 324/212; 324/202; 324/210; 73/1.81; 73/1.89; 360/75; 360/103; 360/135; 428/65.3

(58) Field of Search .................. 324/202, 210, 324/212; 73/1.01, 1.79, 1.81, 1.89, 105; 360/25, 31, 75, 103, 135; 369/55–58; 374/4, 7; 428/64.2, 64.3, 65.3, 900

(56) References Cited

U.S. PATENT DOCUMENTS

| | | | |
|---|---|---|---|
| 4,777,544 | * 10/1988 | Brown et al. | 360/103 X |
| 4,828,895 | * 5/1989 | Bickert et al. | |
| 4,841,389 | * 6/1989 | Hoyt et al. | 360/75 |
| 4,872,071 | * 10/1989 | Easton et al. | 360/31 |
| 4,931,338 | * 6/1990 | Toffle | 360/135 X |
| 5,062,021 | * 10/1991 | Ranjan et al. | 360/135 |
| 5,168,413 | 12/1992 | Coker et al. | 360/137 |
| 5,410,439 | * 4/1995 | Egbert et al. | 324/212 X |
| 5,473,431 | 12/1995 | Hollars et al. | 356/355 |
| 5,640,089 | * 6/1997 | Horikawa et al. | 324/212 |
| 5,689,057 | * 11/1997 | Baumgart et al. | 73/1.01 |
| 5,810,477 | * 9/1998 | Abraham et al. | 374/7 |
| 5,956,217 | * 9/1999 | Xuan et al. | 360/135 |
| 6,088,176 | * 7/2000 | Smith et al. | 360/25 X |

OTHER PUBLICATIONS

Gaudet et al; "Head Flight Height Monitoring", IBM Tech. Discl. Bull., vol. 11 No. 12, p1650, May 1969.*
Blair et al; "Asperity Disk", IBM Tech. Discl. Bull., vol.21 No. 12, p.4999, May 1979.*
Mackintosh; "A Standard Disk for Calibrating Head–Disk Interference Measuring Equipment", IEEE Transactions on Magnetics, vol. Mag–18, No. 6, pp 1230–1232, Nov. 1982.*

\* cited by examiner

*Primary Examiner*—Gerard R. Strecker
(74) *Attorney, Agent, or Firm*—Derek J. Berger; Jonathan E. Olson; Shawn B. Dempster

(57) ABSTRACT

A spacing between a transducer head and disk surface in a disk drive's head-disk interface is monitored. The transducer head includes a magneto resistive element. The surface of the disk includes a region containing at least one asperity extending from the surface to have a height. The transducer head is placed over the region containing the at least one asperity, and the disk is rotated. A determination is then made as to whether the transducer head contacts the at least one asperity.

22 Claims, 7 Drawing Sheets

SYSTEM AND METHOD FOR MONITORING FLYING HEIGHT USING TEXTURED DISKS

BACKGROUND OF THE INVENTION

1. Field of Invention

The present invention generally relates to a disk drive apparatus and, more particularly, to a method for monitoring the flying height of a read/write transducer head relative to a disk surface.

2. Description of Related Art

Disk drives which are used, for example, in work stations, personal computers and portable computers, are required to provide a large amount of data storage within a minimum physical area. Generally, magnetic media type disk drives operate by positioning a read/write transducer head over tracks on a rotating magnetic storage disk. The positioning of the read/write head is accomplished by employing an actuator arm coupled to control electronics. The control electronics control the positioning of the actuator and the reading and writing functions of the transducer head.

Increasing storage capacity demands are being placed on disk drives. Computer systems are requiring disk drives to have higher storage capacity, while occupying a minimal amount of space within the computer system. In order to accommodate these demands, disk drives are being produced with reduced physical size and increased capacity.

One measure of determining the storage capacity of a disk drive is the flying height of the drive's transducer head above the drive's rotating storage disk. The flying height is the distance between the surface of the disk and the read/write head. In operation, a drive's disk achieves a certain angular velocity after start up of the drive, so that a cushion of air is generated above the disk's surface. This cushion of air forces the read/write head up off the surface of the disk to achieve a flying height. Having very small flying heights increases a drive's storage capacity, because flying the read/write head very close to the disk surface allows for high data bit density (i.e., the number of data bits per inch on a data track).

The largest data bit density can be obtained when the read/write transducer head contacts the disk surface. However, repeated contact between the read/write head and the disk surface results in damage to the head and disk. Thus, there has been an industry-wide trend to decrease the flying height in a disk drive without causing the read/write head to actually contact the disk surface.

However, as a read/write head flies over a rotating disk, the flying height does not remain constant, but rather tends to fluctuate slightly above and below a normal flying height. When flying heights are small, a variation in the flying height may cause the read/write head to randomly contact the disk surface. This situation is referred to as intermittent contact. Such repeated contact between the read/write head and disk surface can damage the head and disk. This damage can cause drive failures in an extremely short period of time. Such failures can result in the drive's user losing all of the data stored in the drive.

Accordingly, it is desirable to provide for determining whether the flying height of a read/write transducer head in a disk drive is so small that repeated intermittent contact is likely. When manufacturing disk drives, the ability to make such a determination provides for the testing of manufactured drives to ensure that the flying height is sufficiently large. During a disk drive's operation in the field, such a determination could be made to ensure that the drive is still operating with an acceptably large flying height. If the flying height of a user's drive is determined to be too small, the user can then be notified that the drive should be either serviced or replaced.

SUMMARY OF THE INVENTION

In accordance with the present invention, the flying height for a transducer head in a head-disk interface of a disk drive is monitored. By monitoring the flying height, it can be determined whether the flying height is below a predetermined flying height value. If the flying height is determined to be below the predetermined flying height value, then an indication is provided to signal an increased likelihood of the head contacting the surface of the disk in the head-disk interface.

In order to provide for monitoring the spacing between the transducer head and disk surface, the disk surface includes a region containing a set of asperities. Each asperity in the set of asperities extends from the disk surface to have a height less than the predetermined flying height value. The transducer head is placed over the region containing the asperities, and the disk is rotated. A determination is then made as to whether the spacing between the head and the disk surface is greater than a height of an asperity in the set of asperities.

In order to make such a determination about the spacing, it is determined whether the head contacts an asperity in the set of asperities. Whether such a contact occurs is determined by retrieving and analyzing a signal pattern provided by the transducer head, while the disk is rotating and the transducer head is positioned over the region containing the asperities. In analyzing the signal pattern, it is determined whether the signal pattern is within a predetermined threshold signal envelope.

If the signal pattern is within the predetermined threshold signal envelope, then the head has not contacted an asperity in the set of asperities. Accordingly, the flying height is acceptably large. If the signal pattern is not within the predetermined threshold signal envelope, then the head has contacted an asperity in the set of asperities. Thus, the flying height is unacceptably small.

BRIEF DESCRIPTION OF THE DRAWINGS

Further details of the present invention are explained with the help of the attached drawings in which.

DETAILED DESCRIPTION

Figure 1:
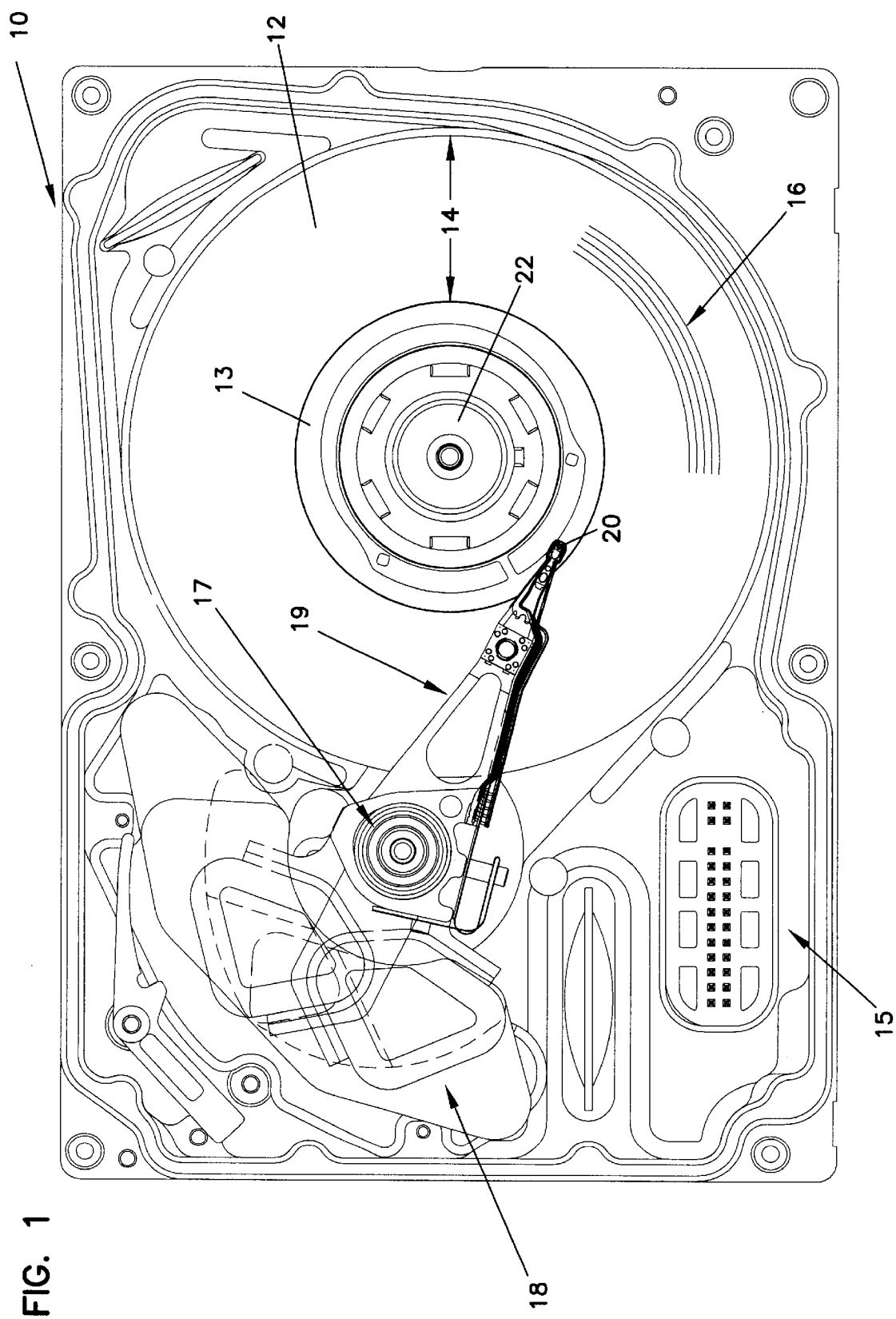
FIG. 1 illustrates a cutaway top view of a disk drive adapted to perform flying height monitoring in accordance with the present invention.

FIG. 1 presents a cutaway top view of a disk drive 10 having a data storage hard disk 12 including a data zone 14 and a landing zone 13. Information can be stored on the hard disk 12 in the form of signals that are written on a series of data tracks 16 formed in the data zone. Also included within the disk drive 10 is a read/write transducer head 20 for reading information present on the hard disk 12 and writing information to the hard disk 12.

The transducer head 20 in one embodiment of the present invention includes a magneto resistive (MR) element (not shown) for reading information from the disk 12 and an inductive element (not shown) for recording data on the disk 12. In such an embodiment, the magneto resistive element includes an alloy film that has a change in resistance in response to the presence of a magnetic field. One example of such an alloy film is a mixture of nickel and iron, although embodiments of the present invention are not limited to having a mixture of nickel and iron.

The read/write transducer head 20 is mounted on an actuator arm 19 which pivots about a pivot 17 in response to control signals provided by a voice coil motor 18. The movement of the actuator arm 19 positions the transducer head 20 with respect to the disk 12. Control circuitry 15 is coupled to the voice coil motor 18 to provide for controlling the movement of the actuator arm 19 via the voice coil motor 18. The control circuitry 15 also includes a preamplifier (not shown) that is coupled to the read/write head 20 to receive and amplify signals that are retrieved from the disk 12 by the head 20. The disk 12 is connected to a spindle motor 22, which provides for rotating the disk 12. The rotation of the disk 12 and positioning of the read/write head 20 provides for data to be transferred between the head 20 and desired regions of the disk's surface.

Figure 2:
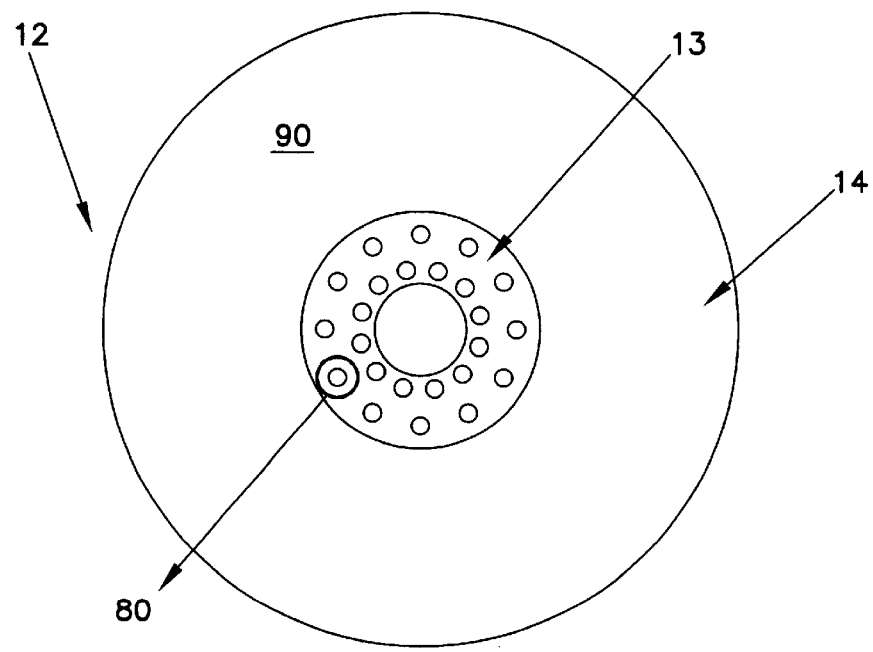
FIG. 2 illustrates a diagram of a textured disk used in conjunction with the present invention.

FIG. 2 illustrates a schematic top view of a surface of the disk 12 shown in FIG. 1. The surface 90 includes a data zone 14 and a landing zone 13. In accordance with the present invention, the surface of the disk 12 is laser textured to have a very smooth surface in the data zone 14 and a roughly textured surface in the landing zone 13. The textured surface in the landing zone 13 includes a number of bumps 80 on which the read/write head 20 rests when the disk 12 is not spinning. These bumps 80 are referred to as asperities 80. In alternate embodiments of the present invention, regions of the disk 12 other than the landing zone are textured to include asperities 80.

The asperities 80 are placed on the disk 12 surface using standard laser texturing processes. In one embodiment of the present invention, the asperities 80 in textured regions of the disk 12 surface have a height extending from the disk's surface of 0.80 microinches. In an alternate embodiment of the present invention, the height of the asperities 80 is in a range of 0.80 microinches to 1.50 microinches. In further embodiments of the present invention, the asperities 80 have a height outside the range of 0.80 microinches to 1.50 microinches, depending on the process parameters by which they are formed and the desired spacing between the transducer head 20 and disk 12 surface 90.

Laser textured asperities prevent a condition called stiction, in which the transducer head 20 and the disk 12 surface stick together upon contact. Stiction can cause drive failure and/or a loss of data. The laser texturing process forms many small asperities 80 at a controlled density and geometry on the landing zone 13 of the disk 12. In one embodiment of the present invention, the asperities 80 have a density such that the centers of any pair of asperities are separated by a distance in the range of 2,000–2,500 microinches in the circumferential direction, and separated by a distance in a range of 800 to 900 microinches in the radial direction. In such an embodiment, the diameters of the asperities are in a range of 150 to 300 microinches.

In accordance with the present invention, an MR element in the transducer head 20 is employed to monitor the flying height of a read/write transducer head 20 over a surface of the disk 12. As discussed above, when the disk drive 10 is in operation, the spinning disk 12 generates a cushion of air on the disk's surface to push the read/write head 20 up off the disk's surface. The distance that the read/write head 20 is displaced from the disk's surface is referred to as the flying height.

In one embodiment of the present invention, a sufficiently large flying height is in a range of 1.50 microinches to 2.50 microinches. When the read/write transducer head's flying height remains within this range, proper data transfer between the head 20 and the disk 12 surface results. If the read/write head 20 falls to a flying height less than 1.50 microinches in such an embodiment, the read/write head 20 is considered to have a flying height which is too small to provide for reliable operation of the disk drive 10. In an alternate embodiment of the present invention, the minimum acceptable flying height is a height greater than 0.80 microinches. As discussed above, small flying heights, such as those listed above, increase the possibility of the read/write head 20 contacting the disk 12 surface to cause either data loss in the area of the disk 12 which is contacted or complete failure of the drive 10.

Figure 3:
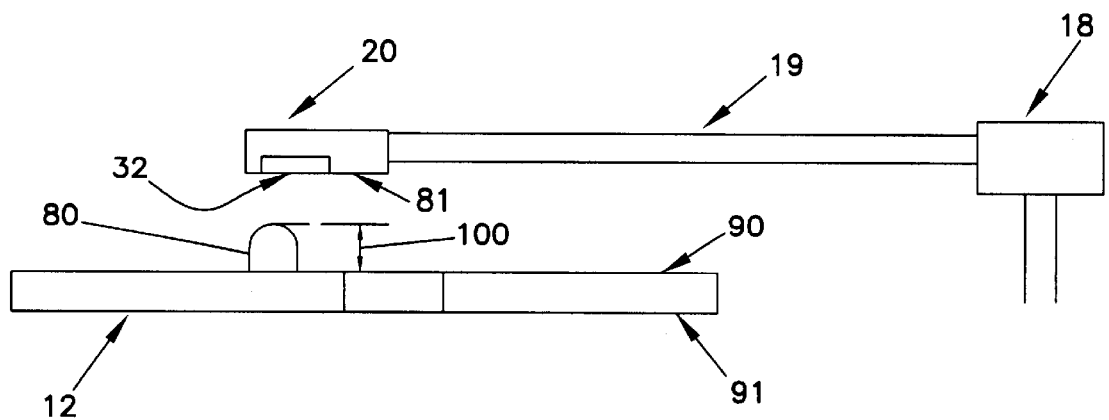
FIG. 3 illustrates a cross-sectional side view of a head-disk interface in a disk drive that operates in accordance with the present invention.

FIG. 3 illustrates a cross-sectional side view of a head-disk interface in the disk drive 10 shown in FIG. 1. As shown in FIG. 3, the read/write head 20 is supported over an upper surface 90 of a disk 12 by an actuator arm 19 and a cushion of air that is generated between the disk 12 surface 90 and head 20 as a result of the disk's rotation. An MR element 32, as described above, is mounted in the face 81 of the transducer head 20 that is exposed to the upper surface 90 of the disk 12. Formed on the upper surface 90 of the disk 12 is at least one asperity 80 that extends upward from the disk's surface 90. In one embodiment of the present invention, a set of asperities 80, as described above with reference to FIG. 2, are included on the disk surface 90.

Each asperity 80 in the set of asperities 80 has a height 100 extending from the upper surface 90 of the disk 12. The asperity height 100 is such that no part of the read/write transducer head 20, including the MR element 32, contacts the asperity 80 when the head's flying height exceeds a predetermined minimum acceptable flying height. In embodiments of the present invention, the predetermined minimum acceptable flying height is equal to the lowest desirable flying height of the head 20 that provides for reliable operation of the disk drive 10. In one embodiment of the present invention, the predetermined minimum acceptable flying height is in a range of 0.80 microinches to 1.50 microinches. When the read/write head 20 is maintained above the minimum acceptable flying height, reliable data transfer is achieved between the head 20 and the disk 12 surface 90. When the read/write head 20 has a flying height that is below the predetermined minimum acceptable flying height, the probability of the head 20 contacting the surface 90 of the disk 12 increases to an unacceptable level.

Although the head-disk interface shown in FIG. 3 has the transducer head 20 positioned over the upper surface 90 of the disk 12, embodiments of the present invention also operate correctly when the transducer head 20 is positioned over a bottom surface 91 of the disk 12, so that the MR element 32 is exposed to the bottom surface 91. In such a configuration, the bottom surface 91 includes asperities that are the same as the asperities 80 described for the upper surface 91.

The presence of disk surface asperities having heights that are equivalent to a minimum acceptable flying height provides a mechanism for detecting whether a head's flying height is unacceptably low. In one embodiment of the present invention, the asperities 80 are formed in the landing zone 13 of the disk 12 so that the flying height of the head 20 can be monitored during the spin up of the disk 12. This provides for the monitoring of the flying height to be performed without infringing on the time that the head 20 may be employed for reading and writing data to and from the disk's data zone 14. However, in alternate embodiments of the present invention, the asperities 80 are not placed in the landing zone 13 of the disk 12 and are placed in other regions on the disk's surface.

Figure 4:
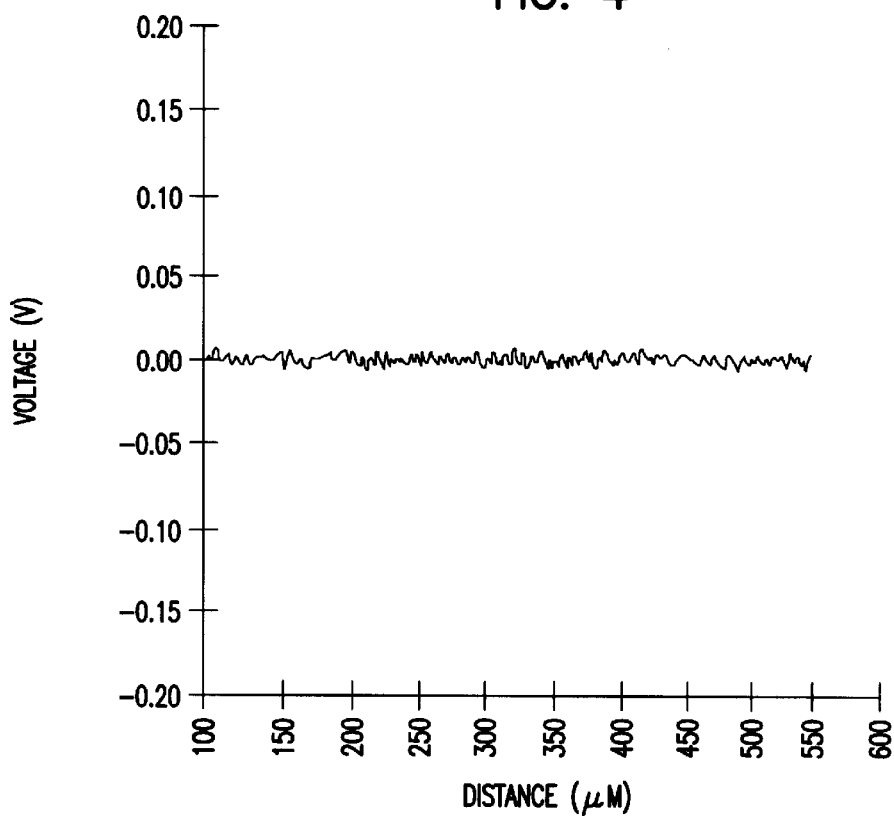
FIG. 4 illustrates a voltage versus distance graph of signals provided by a transducer head that does not contact asperities in accordance with the present invention on a disk region containing no data.
Figure 5:
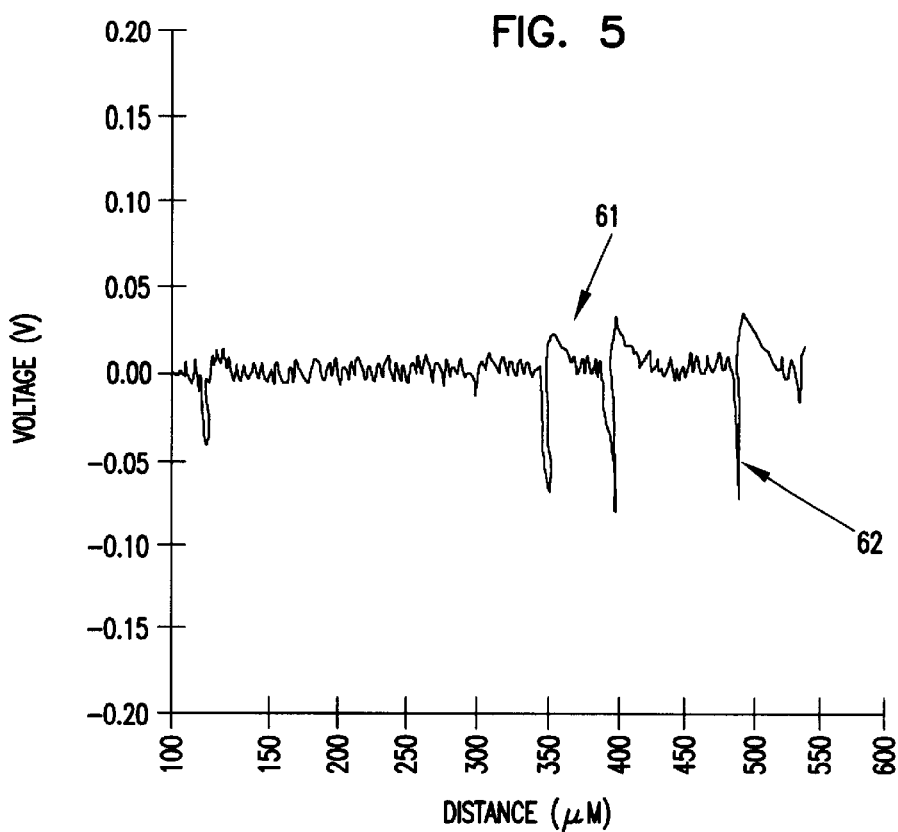
FIG. 5 illustrates a voltage versus distance graph of signals provided by a transducer head that contacts asperities in accordance with the present invention on a disk region containing no data.

When the read/write transducer head 20 is flying at an acceptably high flying height, the head's MR element 32 does not detect the asperities 80 on the surface 90 of the disk 12, since the asperities 80 are below the head's flying height. When no information signals are present on the disk 12, and the head's flying height is greater than the height of the asperities 80, the voltage signal pattern provided by the transducer head 20, including the MR element 32, is a flat DC signal as shown in FIG. 4. FIG. 5 illustrates a graph of voltage versus distance showing the signal patterns provided by the head 20, including the MR element 32, when no information signals are present on the disk 12 surface 90 and the flying height of the head 20 is the same or less than the height of the asperities 80.

As shown in FIG. 5, when the flying height of the head 20 is less than the height of the asperities 80, one of two unique signal patterns is provided by the head 20. In one instance, the MR element 32 of the head 20 comes in direct contact with an asperity 80. When the MR element 32 contacts the asperity 80, a negative voltage deviation 62 occurs at the output of the head 20 for a small period of time. The voltage deviation 62 that occurs as a result of the MR element's 32 contact with the asperity 80 is referred to as a conduction deviation 62 and is shown by voltage spike 62 in FIG. 5.

The voltage spike 62 occurs, because the MR element 32 acts as a metallic resistor when flying over the disk 12, which is electrically grounded. The contact of the MR element 32 with the electrically grounded disk's asperity 80 causes the area surrounding the MR element 32 to be shorted to ground. This shorting causes the head's output signal pattern to include the brief low voltage spike 62. In alternate embodiments of the present invention, conduction deviations are brief high voltage spikes that extend above the voltage levels of normal transducer head signal patterns. In such embodiments, the biasing of the MR element 32 is altered to be negative with respect to the disk 12.

In a second instance, an area of the head 20 in front of the MR element 32 contacts the asperity 80. This can occur when the asperity's height 100 is significantly larger than the flying height of the head 20. Such contact may not result in the MR element 32 itself contacting the asperity 80, so the MR element 32 will not be shorted. However, the contact between the asperity 80 and the front of the head 20 causes the area close to the MR element 32 to become heated. This heating causes a positive voltage deviation 61 (FIG. 5) in the signal pattern being provided by the head 20. The voltage deviation 61 occurring from the heating of the MR element 32 is referred to as a thermal deviation 61. A thermal deviation 61 lasts for a period of time that is longer than the conduction deviation 62. In one embodiment of the present invention, a conduction deviation 62 lasts for a period of several nanoseconds, while a thermal deviation 61 lasts for a period of time on the order of 5 microseconds.

Figure 6:
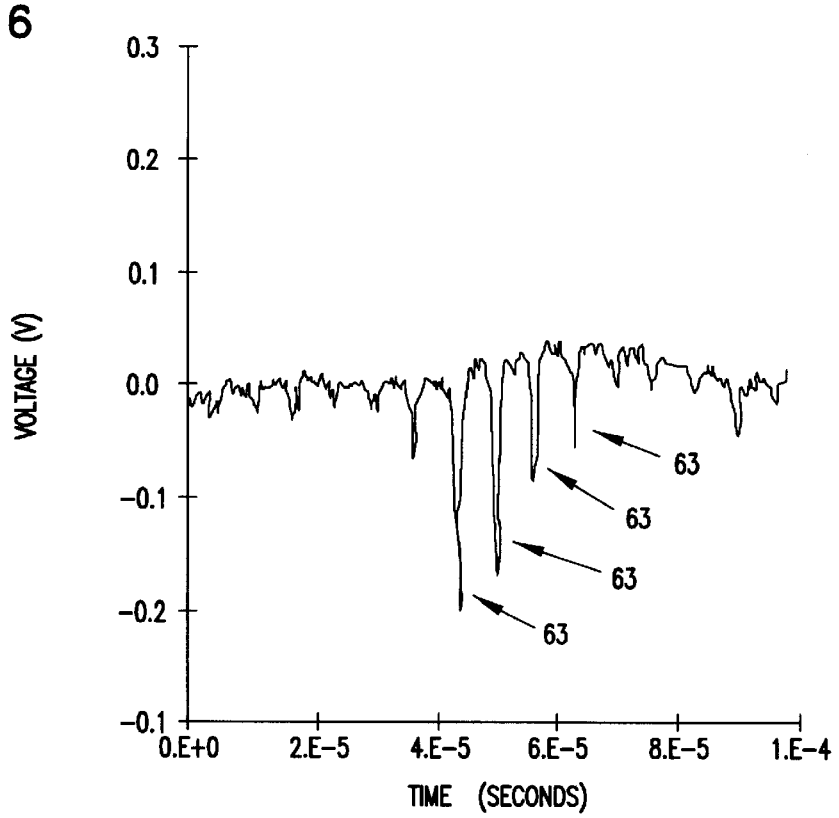
FIG. 6 illustrates a voltage versus time graph of signals provided by a transducer head that contacts asperities in one embodiment of the present invention on a disk region containing no data.
Figure 7:
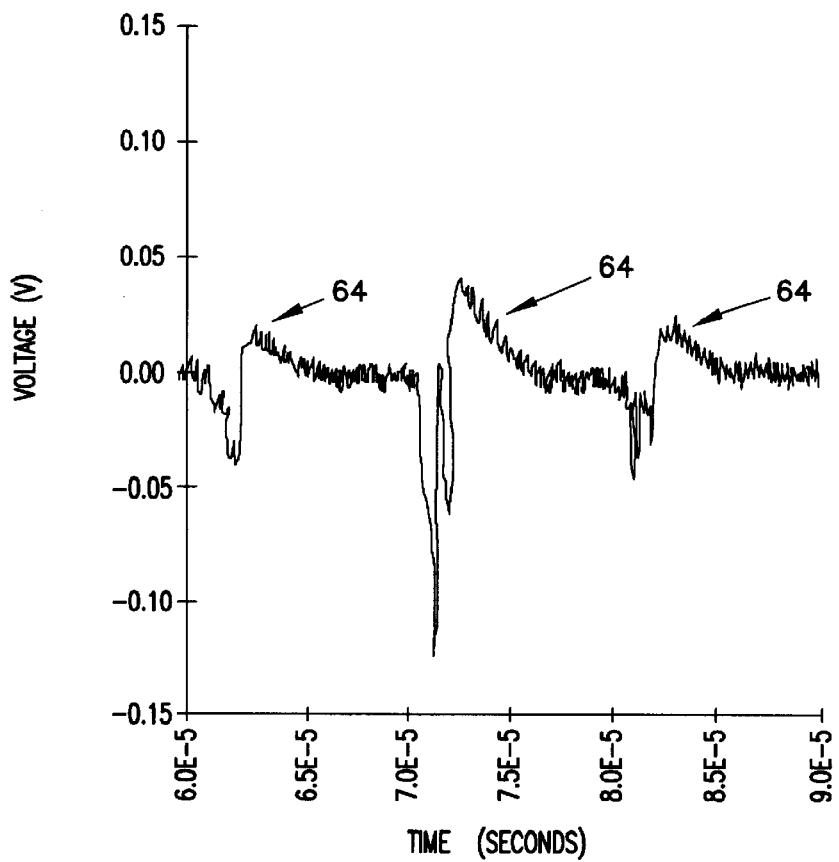
FIG. 7 illustrates a voltage versus time graph of signals provided by a transducer head that contacts asperities in an alternate embodiment of the present invention on a disk region containing no data.

FIGS. 6 and 7 illustrate voltage versus time graphs of signal patterns provided by a transducer head 20 that contacts asperities 80 on a disk surface 90 in a region that does not contain any data. FIG. 6 shows the output of the head 20 when the head's MR element 32 directly contacts asperities 80 on the disk's surface 90 to cause conduction deviations 63. FIG. 7 shows the output of the head 20 when the MR element 32 is heated from the head's contact with asperities 80 to cause thermal deviations 64.

Figure 8:
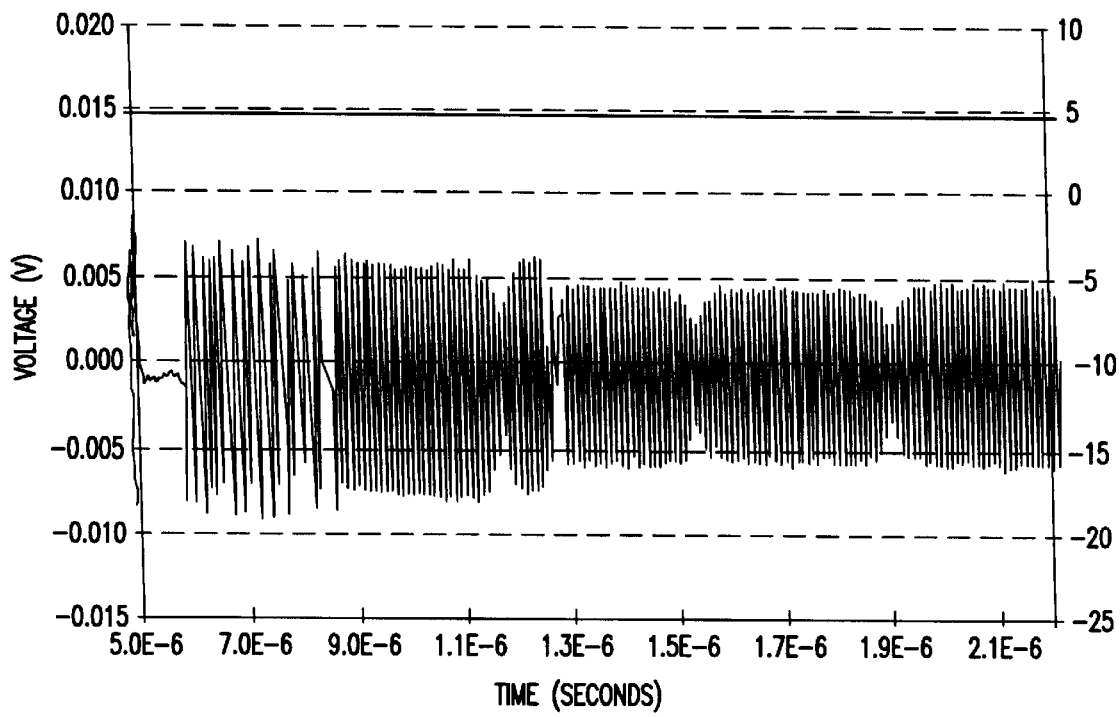
FIG. 8 illustrates a voltage versus time graph of signals provided by a transducer head that does not contact asperities in accordance with the present invention on a disk region containing data.
Figure 9:
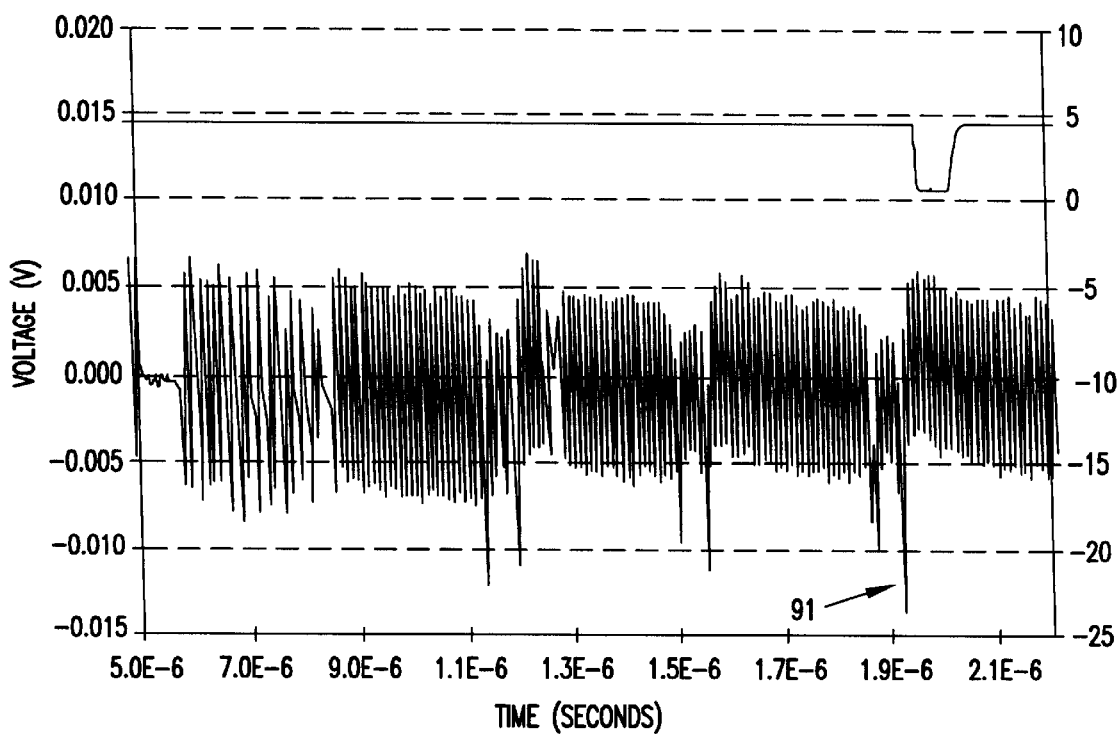
FIG. 9 illustrates a voltage versus time graph of signals provided by a transducer head that contacts asperities in accordance with the present invention on a disk region containing data.

Both thermal deviations and conduction deviations also appear when the disk drive's head 20 collides with asperities 80 in regions of the disk 12 that have signals recorded thereon. FIG. 8 is a graph of voltage versus time, showing a signal pattern that the transducer head 20 provides when reading information signals on the disk 12 surface 90 and having a flying height that is greater than the height of asperities 80 on the disk 12. FIG. 9 shows a graph of voltage versus time depicting a signal pattern provided by a transducer head 20 that is reading information signals from a disk 12 surface 90 and has a flying height that is equal to or less than the height of asperities 80 on the disk 12. Voltage spike 91 in FIG. 9 represents one example of a conduction deviation occurring as a result of the head's MR element 32 contacting an asperity 80 on the disk's surface 90.

As seen from FIGS. 4–9, the signal patterns provided by a transducer head 20 with an MR element 32 can be analyzed to determine whether the flying height of the head 20 is greater than the height of asperities 80 on a disk 12 being read by the head 20. Thus, the formation of asperities 80 which have a height that is less than a predetermined minimum acceptable flying height enables a determination to be made as to whether the head's flying height has fallen below the predetermined minimum acceptable flying height.

For example, in one embodiment of the present invention, it is desirable for the flying height to be greater than 0.80 microinches. In such an embodiment, a region of the disk 12 surface 90, such as the landing zone 13, has asperities 80 formed thereon that each have a height of 0.80 microinches. When the disk drive 10 performs a spin up and the velocity of the disk 12 reaches the operating velocity, the output of the head 20 is monitored to detect whether any thermal deviations or conduction deviations occur.

If neither thermal deviations nor conduction deviations occur, then the flying height of the head 20 is in excess of the 0.80 microinch threshold. If either thermal deviations or conduction deviations are detected, then the flying height of the head 20 is not in excess of the 0.80 microinch threshold. The failure of the head 20 to have a flying height in excess of a predetermined flying height threshold, such as 0.80 microinches, indicates that there is an increased likelihood that the disk 12 may become damaged from head 20 contact, thereby resulting in a loss of data.

Upon detecting an unacceptably low flying height, corrective measures can be taken. If the flying height monitoring is being performed during a disk drive's manufacturing process, then the disk drive can either be discarded or corrected. If the flying height evaluation is being performed during the use of a disk drive by an end-user, then the disk's user can be notified of the insufficient flying height and instructed to take corrective measures. Such corrective measures may include backing-up all of the data that is currently stored on the disk drive and obtaining a new disk drive. As a result, the disk drive's user will not suffer the problem of losing all the data that is stored in the drive.

Figure 10:
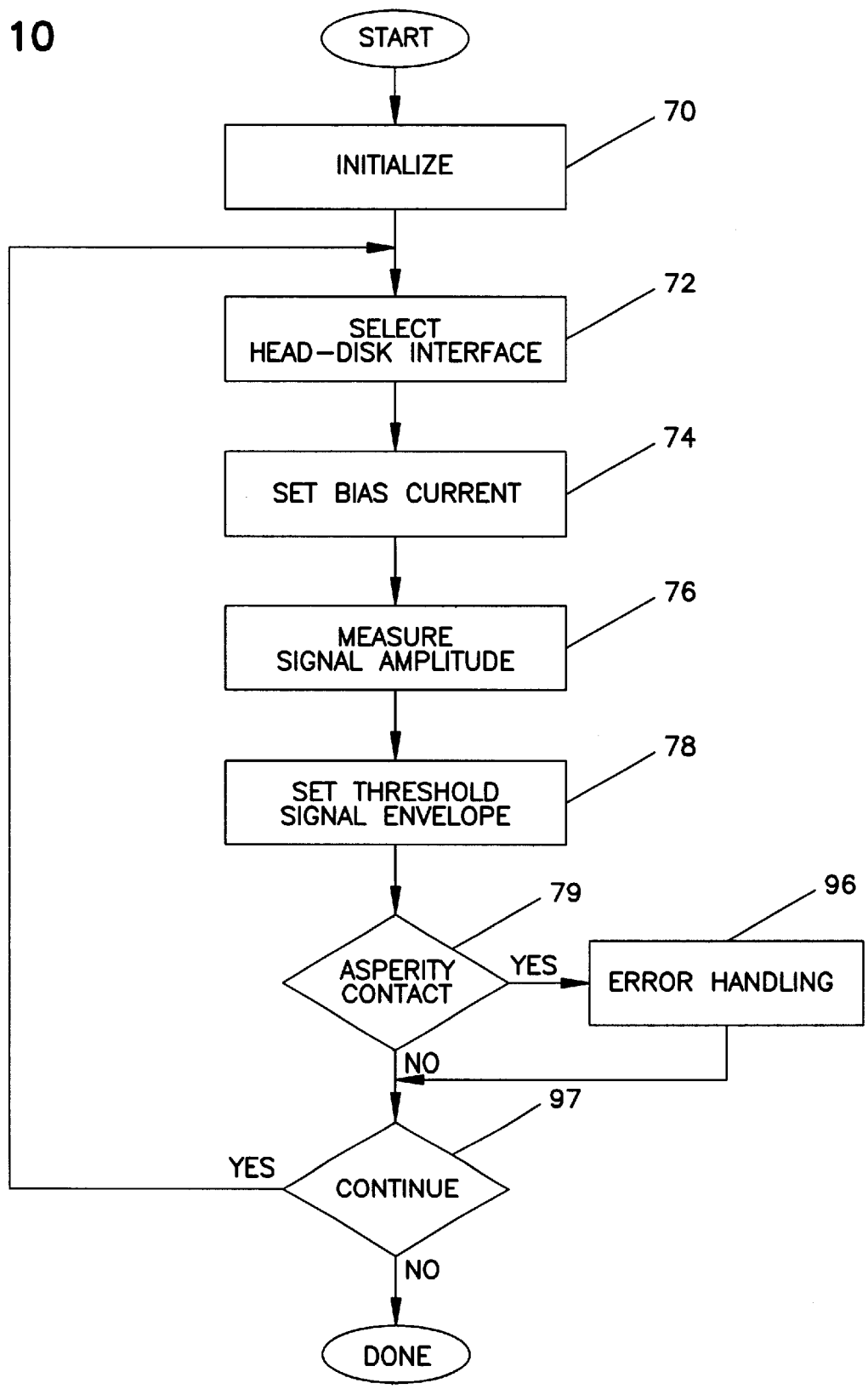
FIG. 10 illustrates a sequence of operations of a flying height monitoring process in accordance with the present invention.

FIG. 10 illustrates a sequence of operations in accordance with the present invention for determining whether a read/write transducer head 20 in a head-disk interface is flying below a minimum acceptable flying height. In accordance with the present invention, the disk's surface 90 includes a region having a set of asperities 80. Each of the asperities 80 in the set of asperities 80 has a height that is slightly less than the minimum acceptable flying height. The sequence of operations set forth in FIG. 10 can be employed in disk drives having either a single head-disk interface or multiple head-disk interfaces. In one embodiment of the present invention, the control circuitry 15 shown in FIG. 1 includes circuitry for performing the sequence of operations illustrated in FIG. 10.

As shown in FIG. 10, an initialization operation is performed in step 70. In the initialization 70, the spindle motor 22 for the disks in the drive 10 rotate the disks to perform a spin up operation. As a result of the spin up, the disks reach an operating velocity and a cushion of air is generated to force the heads off the disks. Also during the initialization 70, the heads in the drive's head-disk interfaces are each positioned over a region on a respective disk. The region includes the asperities 80 to be employed in accordance with the present invention. In one embodiment of the present invention, the region is the landing zone 13. The spin up is performed until the heads are at their normal operating flying height. After the initialization 70 is completed, a read/write transducer head 20 from one of the head-disk interfaces is selected in step 72.

A bias current is then provided to the head 20 in the selected head-disk interface, in step 74. During operation of the disk drive 10, the bias current is provided to the selected head's MR element 32 to allow the MR element 32 to detect signal fluctuation on a disk 12 surface 90. The more current that is provided to the MR element 32 the more sensitive the MR element 32 is to fluctuation changes. In one embodiment of the present invention, a maximum bias current is provided to the MR element 32, so that the MR element's sensitivity to amplitudes of signal fluctuation is maximized. Such a maximum bias current is in a range of 5 to 15 milliamps.

After the bias current is provided, the voltage amplitude of packwriter data on the disk 12 is retrieved from the selected head 20 for measurement in step 76. Packwriter data is data on a disk 12 that alerts the drive's control electronics 15 to begin reading data from the disk 12. The data shown in FIG. 8 illustrates an example of packwriter data. As shown in FIG. 8, packwriter data is mostly contained within a signal envelope defined by a voltage range. For example, the packwriter data in FIG. 8 is within a signal envelope extending from approximately −0.010 volts to 0.007 volts.

A threshold signal envelope is set in step 78 to include voltages that are some percentage higher than the maximum amplitude of the retrieved packwriter data and voltages that are some percentage less than the minimum amplitude of the retrieved packwriter data. The maximum voltage value in the threshold signal envelope is set so that thermal deviations caused by the selected head's contact with an asperity on the corresponding disk 12 exceed the maximum voltage value. The minimum voltage value in the threshold signal envelope is set so that conductive deviations caused by the selected head's MR element 32 contacting an asperity 80 in the corresponding disk 12 fall below the minimum value.

After the threshold signal envelope has been set in step 78, a determination is made, in step 79, of whether the selected head 20 has contacted as asperity 80. This determination is made by retrieving a signal pattern from the transducer head 20, while the selected disk 12 is rotating and the selected head 20 is positioned over the region of the disk 12 containing the asperities 80. The retrieved signal pattern is then analyzed to determined whether it includes a thermal deviation or conduction deviation that falls outside of the threshold signal envelope. The presence of such a thermal deviation or conduction deviation, indicates that an asperity has been contacted, and the selected head 20 is therefore flying below the minimum acceptable flying height. The absence of thermal and conduction deviations indicates that no asperity contact has been made and the flying height of the selected head 20 is greater than the minimum acceptable flying height.

A thermal deviation is detected when the signal patterns retrieved by the selected head 20 include a voltage that exceeds the maximum voltage in the threshold signal envelope set in step 78. A conduction deviation is detected when the signal patterns retrieved from the selected head 20 include a voltage that is less than the minimum voltage in the threshold signal envelope set in step 78. If a conduction or thermal voltage deviation is detected in step 79, an error handling step 96 is performed. In the error handling step 96, in one embodiment of the present invention, an indication of the detected deviation is provided. Such an indication can be employed by a disk drive's user as a signal to back-up the data on the drive and either repair or replace the drive.

Once the error handling step 96 is completed a determination is made whether to perform further flying height monitoring in step 97. If an asperity contact is not detected in step 79, the determination of whether further flying height monitoring is to be performed is also made in step 97. If it is determined that no further monitoring is desired in step 97, then the flying height monitoring process is done. Otherwise, a new head-disk interface is selected in step 72 and the above-described process is repeated to determine whether the flying height for the newly selected head-disk interface is acceptable.

Further embodiments of the present invention can also be employed to detect whether a disk in a head-disk interface has been damaged during a disk drive's operation in the field. When a drive is either powered up or powered down, the drive's disks spin up or spin down, respectively, with the heads in the landing zones of the disks. Damage can be caused to a disk in the disk's landing zone, since a head is continually taking off and landing in this region. Further, a head can be caused to contact and damage a disk's landing zone from physical shock that occurs from external sources while the disk drive is powered down. For example, the computer containing the disk drive may be dropped, thereby causing a head to crash into a corresponding landing zone.

The damage caused to the disks by such wear is referred to as a head slap. A read/write head taking off and landing repeatedly over a head slap is very likely to induce substantial disk wear and generate a significant amount of debris and contamination within the disk drive. This debris and contamination results in data errors and disk crashes.

Figure 11:
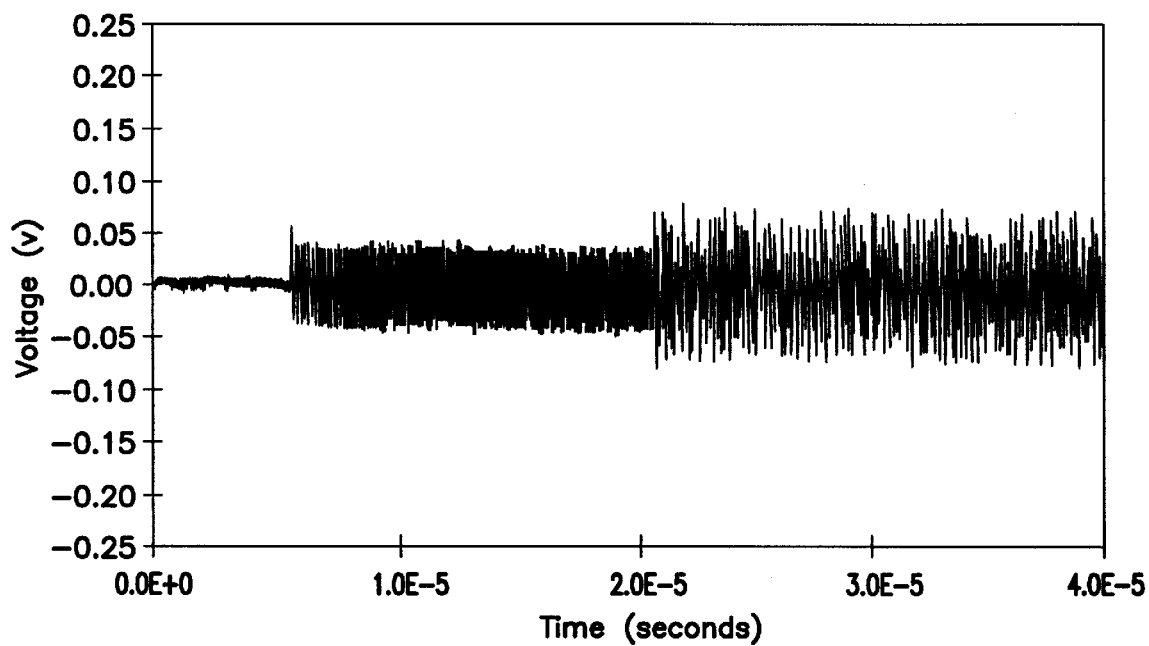
FIG. 11 illustrates a voltage versus time graph of signals provided by a transducer head that does not encounter worn or damaged portions of a disk's surface on a disk region containing data.
Figure 12:
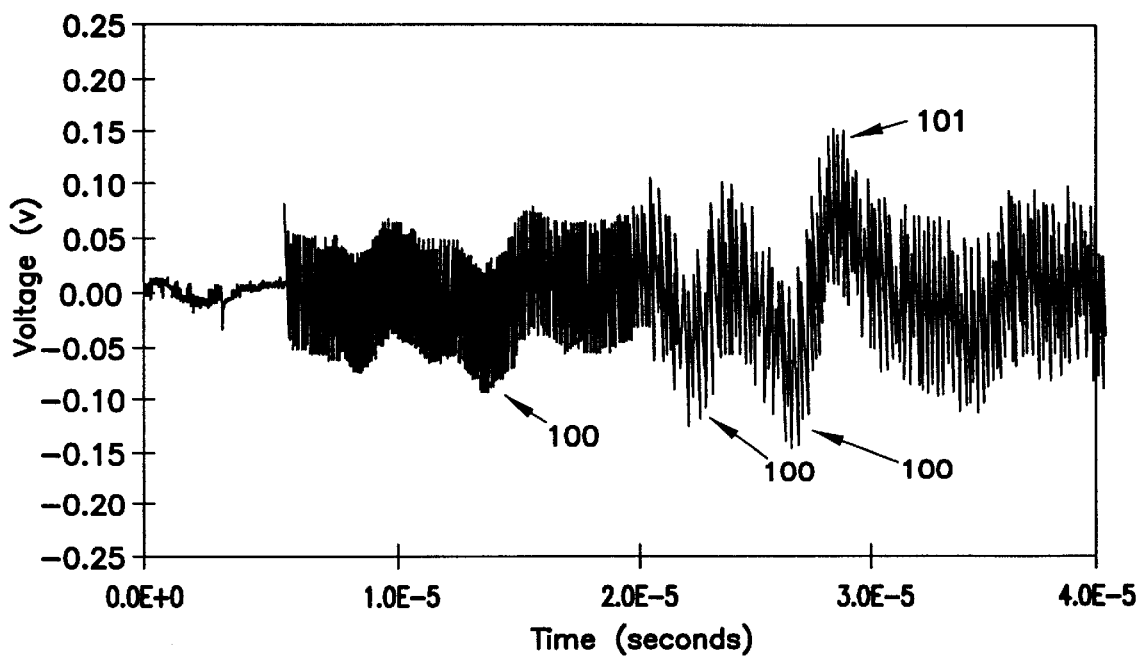
FIG. 12 illustrates a voltage versus time graph of signals provided by a transducer head that does encounter worn or damaged portions of a disk's surface on a disk region containing data.

When a disk is worn or damaged from contact with a head, as described above, both thermal deviations and conduction deviations occur in the signal patterns being provided by the head. FIGS. 11 and 12 illustrate such thermal deviations and conduction deviations. FIG. 11 illustrates a voltage versus time graph depicting a signal pattern that the transducer head 20 provides when reading information signals on a disk 12 surface 90 that is neither worn nor damaged from contact with a head 20. FIG. 12 shows a graph of voltage versus time depicting a signal pattern provided by the transducer head 20 when reading information signals from a disk 12 surface 90 that is either worn or damaged from contact with the head 20. As shown in FIG. 12, a worn or damaged disk 12 surface 90 results in the signal pattern from the head 20 having conduction deviations 100 and thermal deviations 101 that extend outside the normal operating signal envelope shown in FIG. 11.

Accordingly, the process described above with reference to FIG. 10 can be employed to detect disk wear and damage. In such an instance, the threshold signal envelope being set in step 78 is set so that the maximum voltage value of the envelope would be exceeded by a thermal deviation caused by a head encountering worn or damaged parts of a disk. The minimum voltage value of the envelope is set so that a conduction deviation produced by the head when encountering disk wear or damage falls below the minimum voltage value. A signal containing neither conduction deviations nor thermal deviations would fall within the threshold signal envelope. The amplitudes for a normal deviation free signal pattern would be measured in step 76.

Although the present invention has been described in terms of specific exemplary embodiments, it will be appreciated that various modifications and alterations might be made by those skilled in the art without departing from the spirit and scope of the invention as specified by the following claims.

What is claimed is:

1. An article of manufacture comprising:
a recording disc having at least one asperity of a predetermined height nominally equal to a minimum acceptable flying height of a transducer head; and
control circuitry operably coupled to the transducer head and configured to indicate whether the transducer has reached an unacceptably low flying height based on whether the transducer head contacts the at least one asperity.

2. An apparatus comprising:
a recording disc having a region textured to provide asperities of a predetermined height nominally equal to a flying height of a transducer head that has reached an unacceptably low flying height; and
means for determining contact of said transducer head with at least one of said asperities.

3. A method for monitoring a spacing between a transducer head in a disk drive and a surface of a disk in the disk drive, wherein the surface includes a region containing at least one asperity extending from the surface to have a controlled height equal to an unacceptably low spacing, and wherein said transducer head includes a magneto resistive element, said method comprising steps of:
(a) placing the transducer head over the region;
(b) determining whether the transducer head contacts the at least one asperity; and
(c) providing an indication that the spacing is unacceptable, if in said determining step (b) a determination is made that said transducer head contacted said at least one asperity.

4. The method of claim 3 wherein said determining step (b) includes steps of:
(b1) rotating the disk;
(b2) retrieving a signal pattern from the transducer head while the disk is rotating and the transducer head is positioned over the region; and
(b3) determining whether said signal pattern is within a predefined threshold signal envelope.

5. The method of claim 3, wherein said determining step (b) includes a step of:
(b1) determining whether said signal pattern indicates a conduction deviation.

6. The method of claim 4, wherein said determining step (b3) includes a step of:
(b3A) determining whether said signal pattern includes a voltage greater than a maximum voltage in said predefined threshold signal envelope.

7. The method of claim 3, wherein the at least one asperity has a nominal height less than a predetermined minimum acceptable flying height value for the transducer head.

8. The method of claim 7, wherein the nominal height is 0.80 microinches.

9. A method for monitoring a spacing between a transducer head in a disk drive and a surface of a disk in the disk drive, said method comprising steps of:
(a) providing a region on the disk surface containing a set of asperities on the surface, each asperity in the set of asperities extending from the surface to have a height less than a predetermined value nominally equal to a minimum acceptable transducer head flying height;
(b) placing the transducer head over the region containing the set of asperities;
(c) rotating the disk; and
(d) determining whether the spacing is at least equal to the minimum acceptable flying height by determining whether the transducer head has collided with any of the asperities in the set.

10. The method of claim 9, in which said transducer head includes a magneto resistive element, wherein said determining step (d) includes a step of:
(d1) determining whether the magneto resistive element has contacted any of the asperities in the set.

11. The method of claim 10, wherein said determining step (d1) includes steps of:
(d1A) retrieving a signal pattern from the transducer head while the disk is rotating and the transducer head is positioned over the region containing the set of asperities; and (d1B) determining whether said signal pattern is within a predefined threshold signal envelope.

12. The method of claim 11, wherein said determining step (d1B) includes a step of:
(d1Bi) determining whether said signal pattern includes a voltage magnitude less than a maximum voltage in the predefined threshold signal envelope.

13. The method of claim 9, wherein said determining step (d) includes a step of:
(d1) determining whether a portion of the transducer head other than the magneto resister element contacts an asperity in the set of asperities.

14. The method of claim 13, wherein said determining step (d1) includes steps of:
(d1A) retrieving a signal pattern from the transducer head while the disk is rotating and the transducer head is positioned over the region containing the set of asperities; and
(d1B) determining whether said signal pattern is within a predefined threshold signal envelope.

15. The method of claim 14, wherein said determining step (d1B) includes a step of:
(d1Bi) determining whether said signal pattern includes a voltage magnitude greater than a minimum voltage in said predefined threshold signal envelope.

16. A disk drive comprising:
an actuator arm;
a transducer head coupled to said actuator arm, wherein said transducer head includes a magneto resistive element; and
a disk including a surface, wherein said surface includes a region having a set of asperities extending from said surface wherein each asperity in said set extends from said surface to have a height nominally equal to a predetermined value nominally equal to an unacceptably low flying height of the head above the disk surface.

17. The disk drive of claim 16, further including:
means for determining whether a distance between said transducer head and said surface of said disk is less than said predetermined flying height.

18. The disk drive of claim 17, wherein said means for determining includes:
means for retrieving a signal pattern from said transducer head while said disk is rotating and said transducer head is positioned over said region; and
means for determining whether said signal pattern is within a predefined threshold signal envelope.

19. The disk drive of claim 18, wherein said means for determining whether said signal pattern is within a predefined threshold signal envelope includes:
means for determining whether said signal pattern includes a voltage less than a minimum voltage in said predefined threshold signal envelope.

20. The disk drive of claim 18, wherein said means for determining whether said signal pattern is within a predefined threshold signal envelope includes:
means for determining whether said signal pattern includes a voltage greater than a maximum voltage in said predefined threshold signal envelope.

21. The disk drive of claim of 16 in which the region is annular.

22. The apparatus of claim 2 in which the transducer head includes a magneto resistive element.

* * * * *